United States Patent
Kim et al.

(10) Patent No.: US 11,086,563 B2
(45) Date of Patent: Aug. 10, 2021

(54) STORAGE DEVICE INCLUDING A MEMORY CONTROLLER AND A METHOD OF OPERATING AN ELECTRONIC SYSTEM INCLUDING MEMORY

(71) Applicant: SAMSUNG ELECTRONICS CO., LTD., Suwon-si (KR)

(72) Inventors: Seonbong Kim, Suwon-si (KR); Mina Hwang, Seoul (KR); Hojun Shim, Yongin-si (KR); Kwanggu Lee, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 147 days.

(21) Appl. No.: 16/414,181

(22) Filed: May 16, 2019

(65) Prior Publication Data
US 2020/0142632 A1    May 7, 2020

(30) Foreign Application Priority Data

Nov. 7, 2018    (KR) .......................... 10-2018-0135850

(51) Int. Cl.
G06F 3/06    (2006.01)
(52) U.S. Cl.
CPC .......... *G06F 3/0658* (2013.01); *G06F 3/0604* (2013.01); *G06F 3/0673* (2013.01)
(58) Field of Classification Search
None
See application file for complete search history.

(56) References Cited

U.S. PATENT DOCUMENTS

| | | | |
|---|---|---|---|
| 5,852,602 A * | 12/1998 | Sugawara | H04L 12/5602 370/235.1 |
| 6,393,506 B1 | 5/2002 | Kenny | |
| 7,536,489 B2 | 5/2009 | Oshikiri et al. | |
| 7,644,239 B2 | 1/2010 | Ergan et al. | |
| 7,715,311 B2 * | 5/2010 | Herrmann | H04L 1/1819 370/227 |
| 8,144,582 B2 | 3/2012 | Brown et al. | |
| 8,310,880 B2 * | 11/2012 | Kuehne | G06F 12/00 365/189.011 |
| 8,347,011 B2 | 1/2013 | Futral et al. | |
| 8,392,667 B2 | 3/2013 | Duncan et al. | |
| 8,934,337 B2 * | 1/2015 | Schel | H04W 36/26 370/225 |
| 2005/0254085 A1 | 11/2005 | Oshikiri et al. | |
| 2008/0212537 A1 * | 9/2008 | Bukai | H04W 36/30 370/332 |
| 2009/0154426 A1 * | 6/2009 | Perraud | H04W 36/26 370/332 |

(Continued)

OTHER PUBLICATIONS

GenZ Core Specification, 983 pgs.

*Primary Examiner* — Elias Mamo
(74) *Attorney, Agent, or Firm* — F. Chau & Associates, LLC

(57) ABSTRACT

A storage device includes a memory controller to receive a first signal from an external device through a first channel, obtain data from a memory based on the first signal, and output the data to the external device through a second channel. The data is output through the second channel in a case where a time interval between a time when the first signal is received and a time when the data are obtained is greater than a first reference interval.

8 Claims, 13 Drawing Sheets

(56) References Cited

U.S. PATENT DOCUMENTS

2012/0221771 A1* 8/2012 Yoon .................. G06F 12/0246
                                                          711/103
2016/0373362 A1   12/2016 Cheng et al.
2017/0075570 A1    3/2017 Yoon et al.
2018/0077649 A1    3/2018 Fukami et al.

* cited by examiner

FIG. 9

| TC0 ~ TC4 | VC 0 |
|-----------|------|
| TC5 ~ TC6 | VC 1 |
| TC 7      | VC 2 |

STORAGE DEVICE INCLUDING A MEMORY CONTROLLER AND A METHOD OF OPERATING AN ELECTRONIC SYSTEM INCLUDING MEMORY

CROSS-REFERENCE TO RELATED APPLICATIONS

This application claims priority under 35 U.S.C. § 119 to Korean Patent Application No. 10-2018-0135850, filed on Nov. 7, 2018, in the Korean Intellectual Property Office, the disclosure of which is incorporated. by reference herein in its entirety.

BACKGROUND

1. Field

Embodiments of the inventive concept described herein relate to a storage device, and more particularly to a storage device including a memory controller and a memory.

2. Description of Related Art

Smart phones, tablets, and other electronic devices perform a variety of functions. These functions are expected to increase as semiconductor technology continues to evolve. In order to support these functions, data storage capacity and performance should also increase.

Data storage may be outside or inside an electronic device. When the storage device is inside an electronic device, the electronic device may access the storage device using a host device, such as a central processing unit (CPU), an application processor (AP), or a graphic processing unit (GPU).

As the number of functions of an electronic device increases, the amount of data to be processed by the storage device may increase. Also, as the functions of an electronic device become more diverse, the number of host devices accessing a single storage device at the same time may increase. Both of these effects may introduce delays or otherwise increase the time of interaction between a host or an electronic device and operations of the storage device.

SUMMARY

Embodiments of the inventive concept provide a storage device capable of reducing or minimizing the transmission delay of a response signal to be provided to a host.

In accordance with one or more embodiments, a storage device includes a memory configured to store data and a memory controller configured to receive a first signal from an external device through a first channel, the first signal to request the data from the memory; obtain the data from the memory based on the first signal; and output the data to the external device through a second channel different from the first channel. The data is output through the second channel in a case where a time interval between a time when. the first signal is received and a time when the data are obtained is greater than a first reference interval.

In accordance with one or more embodiments, a storage device includes a memory configured to store data and a memory controller configured. to receive a first signal, which directs a second operation to be performed in the memory, from an external device through a first channel and output a second signal to the external device through a second channel based on the first signal, the second channel different from the first channel, in a case where the memory controller receives the first signal while the memory performs a first operation.

In accordance with one or more embodiments, a method of operating an electronic system includes receiving a first signal from a host through a first channel; outputting a second signal to the memory based on the first signal, the second signal requesting data stored in a memory; obtaining the data from the memory based on the second signal; and outputting the data through a second channel is different from the first channel such that the data are transmitted to the host, in a case where a time interval between a time at which the first signal is received and a time at which the second signal is output is greater than a reference interval.

BRIEF DESCRIPTION OF THE FIGURES

The above and other objects and features of the inventive concept will become apparent by describing in detail exemplary embodiments thereof with reference to the accompanying drawings,
FIG. 9 illustrates an example of channel data.

DETAILED DESCRIPTION

Below, embodiments of the inventive concept may be described in detail and clearly to such an extent that an ordinary one in the art easily implements the inventive concept.

Figure 1:
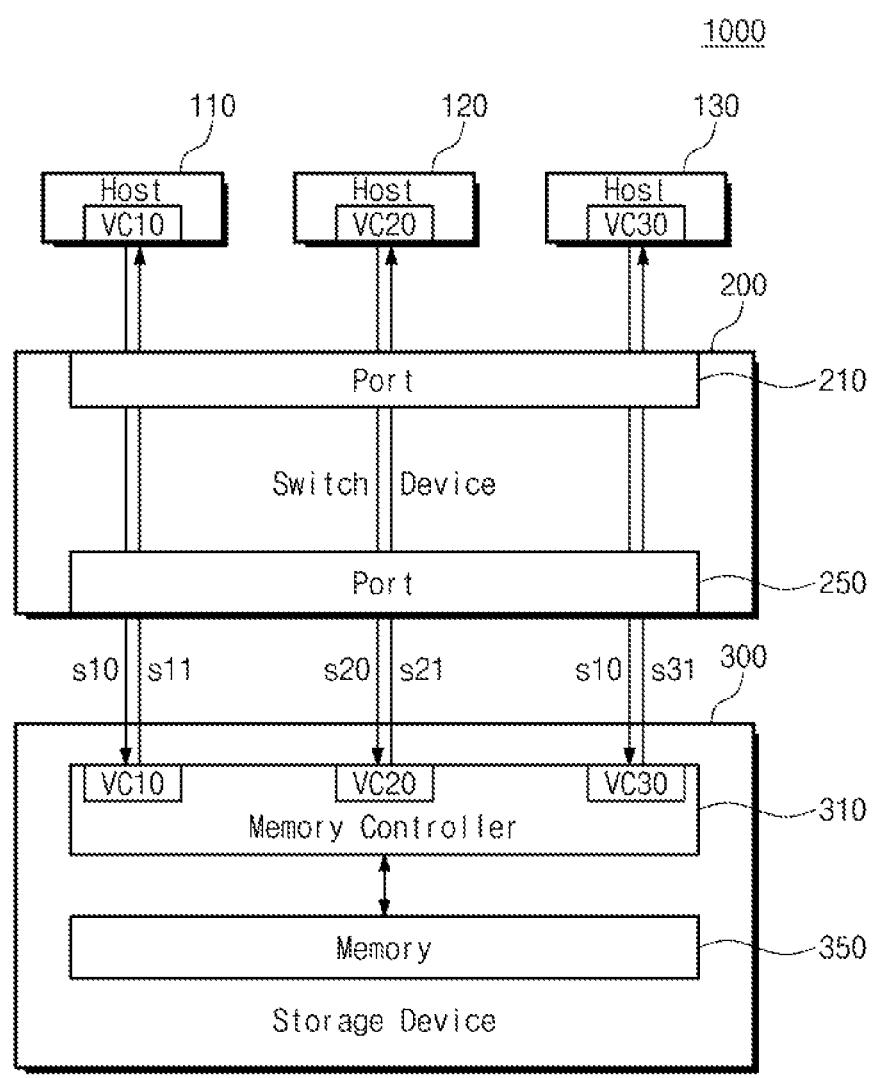
FIG. 1 illustrates an example of an electronic system.

FIG. 1 illustrates an example of an electronic system 1000 including one or more hosts 110, 120, and 130, a switch device 200, and a storage device 300. In one case, a "host" may be any kind of device or entity that accesses the storage device 300 through the switch device 200. Below, the electronic system 1000 is described as including three hosts 110, 120, and 130, but the electronic system 1000 may have a different number of (e.g., one, two, or four or more) hosts.

In one case, the electronic system 1000 may be one electronic device such as a desktop personal computer (PC), a notebook, a tablet, and a smartphone. In another ease, the electronic system 1000 may be a combination of electronic devices. When the electronic system 1000 is implemented as one electronic device, each of the hosts 110, 120, and 130 may include, for example, a processor such as a central processing unit (CPU), an application processor (AP), or a graphic processing unit (GPU). When the electronic system 1000 is implemented as a combination of electronic devices, each of the hosts 110, 120, and 130 may include, for example, a desktop PC, a notebook, a tablet, or a smartphone. In one case, the electronic system 1000 may be a memory centric system.

The hosts 110, 120, and 130 may request an operation to be performed in the storage device 300. For example, the hosts 110, 120, and 130 may transmit signals s10, s20, and s30 to the storage device 300 for the purpose of directing an operation (e.g., a read operation, a write operation, an erase operation, etc.) to be performed in the storage device 300. The signals s10, s20, and s30 may include, for example, a command, and/or data, associated with the operation to be performed in the storage device 300.

The hosts 110, 120, and 130 may output the signals s10, s20, and s30 to the storage device 300 through corresponding channels VC10, VC20, and VC30. The channels VC 10, VC20, and VC30 may serve as communication paths for transmitting and receiving signals between the hosts 110, 120, and 130 and the storage device 300. For example, the channels VC10, VC20, and VC30 may be one or more virtual channels for transmitting signals in an asynchronous transfer mode. The signals s10, s20, and s30 may he input to the storage device 300 through the switch device 200. The switch device 200 may be on the communication paths provided by the channels VC10, VC20, and VC30.

The storage device 300 may include a memory controller 310 and a memory 350. The memory controller 310 may receive the signals s10, s20, and s30 and control the memory 350 depending on the received signals s10, s20, and s30. For example, the memory controller 310 may control the memory 350 to perform operations directed by the signals s10, s20, and s30.

The memory 350 may include a nonvolatile memory, a volatile memory, or a combination of nonvolatile and volatile memories. In one case, the memory 350 may be a memory pool in which a nonvolatile memory and a volatile memory are combined, A volatile memory may lose data stored therein when power is turned off. Examples include a static random access memory (SRAM), a dynamic ram (DRAM), a synchronous DRAM, etc. A nonvolatile memory may retain data stored therein when power is turned off Examples include a read only memory (ROM), a programmable ROM (PROM), an electrically programmable. ROM (EPROM), an electrically erasable and programmable ROM (EEPROM), a phase-change RAM (PRAM), a magnetic RAM (MRAM), a resistive RAM (RRAM), a ferroelectric RAM (FRAM), etc.

The memory 350 may perform operations directed by the signals s10, s20, and s30 under control of the memory controller 310. For example, the memory 350 may store (e.g., write) data or may provide (e.g., read) data stored therein under control of the memory controller 310.

When the memory 350 completes the operations directed by the signals s10, s20, and s30, the memory controller 310 may transmit signals s11, s21, and s31 (corresponding to the signals s10, s20, and s30) through respective ones of the channels VC10, VC20, and VC30. The signals s11, s21, and s31 may include a response to the signals sift, s20, and s30 and/or relevant data. For example, in the case where the signal s10 is received through the channel VC10, the memory controller 310 may output the signal s11 corresponding to the signal s10 through the channel VC10.

The switch device 200 may include, for example, a fabric switch configured with a fiber channel in a network. The switch device 200 may use an interfacing scheme such as PCI express (PCIe), CCIX, or Gen-z. In another case, the switch device 200 may use another type of interfacing scheme.

The switch device 200 may include a number of ports. Below, the switch device 200 is described as having two ports 210 and 250, but may include a different number of ports, e.g., one port or three or more ports. In such an arrangement, the signals s10, s20, and s30 output from the hosts 110, 120, and 130 may be transmitted to the port 210, and the signals s11, s21, and s31 output from the storage device 300 may be transmitted to the port 250. In one case, the ports for transmitting or receiving the signals s10, s20, and s30 may be different, and the ports for transmitting or receiving the signals s11, s21, and s31 may be different.

The signals s10, s20, and s30 may be transmitted to the storage device 300 through the switch device 200. The signals s11, s21, and s31 may be transmitted to the hosts 110, 120, and 130 through the switch device 200. For example, the port 210 may receive the signals s10, s20, and s30 output from the hosts 110, 120 and 130, and then output the signals s10, s20, and s30 to the port 250. The port 250 may receive the signals s10, s20, and s30 and then output the signals s10, s20, and s30 to the storage device 300. The port 250 may receive the signals s11, s21, and s31 output from the storage device 300 and then output the signals s11, s21, and s31 to the port 210. The port 210 may receive the signals s11, s21, and s31 and then output the signals s11, s21, and s31 to the hosts 110, 120, and 130.

Figure 2:
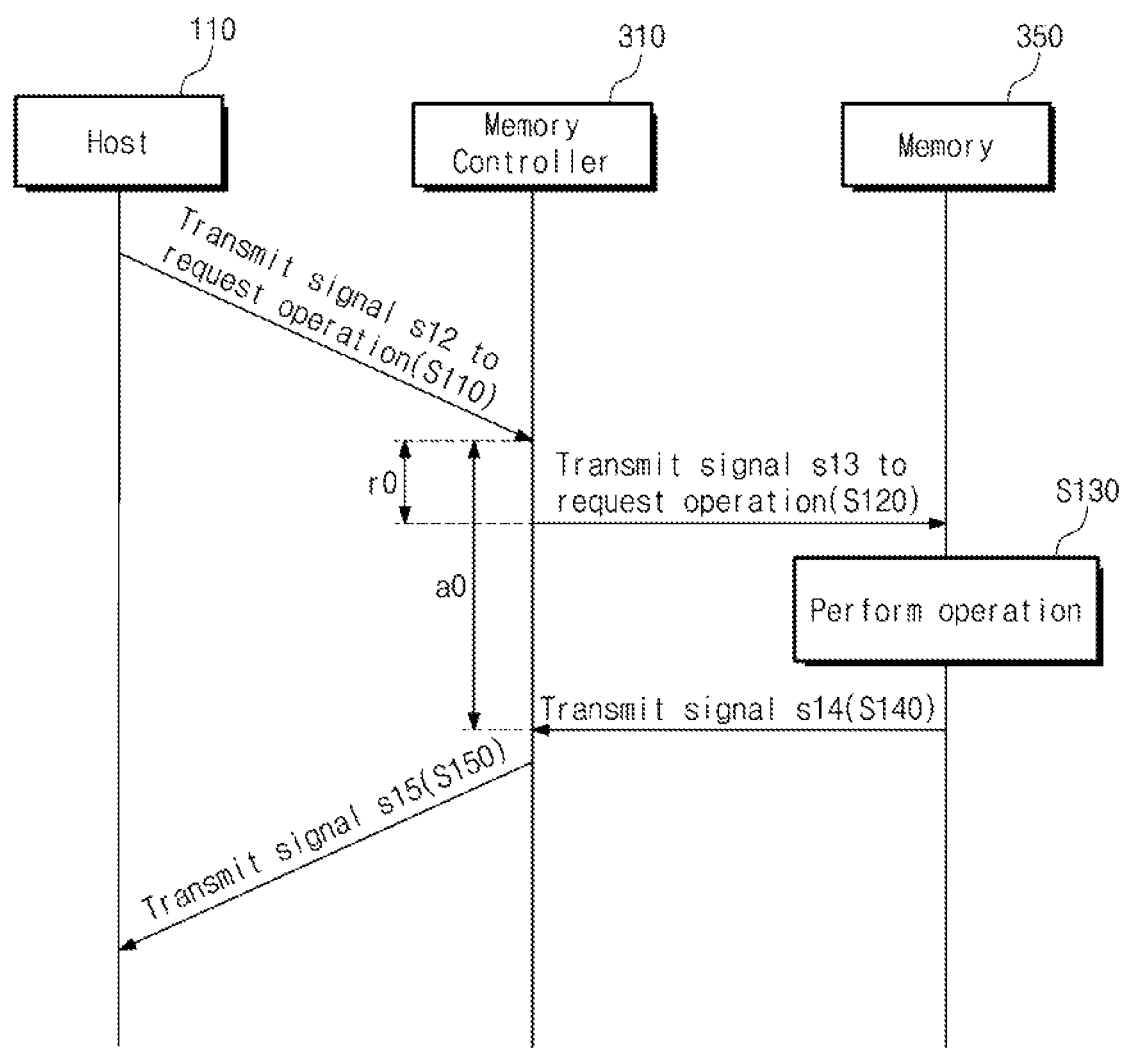
FIG. 2 illustrates an example operation of the electronic system.

FIG. 2 illustrates an example of how signals s12, s13, s14, and s15 may be exchanged between and among the host 110, the memory controller 310, and the memory 350 of FIG. 1. In this case, the signal s12 is input to the memory controller 310 at a time when the memory 350 does not operate, e.g., is not performing one or more predetermined operations or not performing any operation.

In operation S110, the host 110 may output the signal s12 to the memory controller 310 through a channel VC0. The signal s12 may include a command which directs the memory 350 to perform an operation, and/or may include data. The memory controller 310 may receive the signal s12.

In operation S120, when the signal s12 is input to the memory controller 310 while the memory 350 does not operate, the memory controller 310 may output the signal s13 to the memory 350 based on the signal s12. The signal s13 may include a command to direct the memory 350 to perform an operation, and/or may include data. The memory 350 may receive the signal s13, A reference delay interval r0 may exist between the time when the memory controller 310 receives the signal s12 and the time when the memory controller 310 outputs the signal s13. An example of the reference delay interval r0 will be described with reference to FIG. 3.

In operation S130, the memory 350 may perform the operation directed by the signal s13.

In operation S140, when the operation is completed, the memory 350 may output the signal s14 to the memory controller 310. The signal s14 may include information indicating that the memory 350 has completed the operation. For example, when a read operation is completed, the memory 350 may output the signal s14 to the memory controller 310. The signal s14 may include data read by the read operation. The memory controller 310 may receive the signal s14. A reference operation interval a0 may exist between the time when the memory controller 310 receives the signal s12 and the time when the memory controller 310 receives the signal s14. An example of the reference operation interval a0 will be described with reference to FIG. 3.

In operation S150, the memory controller 310 may output the signal s15 to the host 110 based on the signal s14.

Thus, in accordance with the process flow in FIG. 2, the host 110 may output the signal s12 for directing a read operation to be performed in (e.g., requesting of data from) the memory 350 (S110). The memory controller 310 may output the signal s13 to the memory 350 based on the signal s12 (S120). The signal s13 may be a signal for requesting the data from the memory 350. The memory 350 may perform the read operation in response to the signal s13. After the memory 350 completes the read operation, the memory controller 310 may receive the signal s14 including the data read from the memory 350 (S140). The memory controller 310 may output the signal s15 (including the read data) to the host 110 (S150).

In one implementation, before the signal s14 is received, the memory controller 310 may output the signal s15 based on the signals s12 and s13. The memory controller 310 may output the signal s15 to the host 110 after outputting the signal s13.

In one implementation, the host 110 may output the signal s12 for directing a write operation to be performed in the memory 350 (S110). The memory controller 310 may output the signal s13 to the memory 350 based on the signal s12 (S120). The signal s13 may include a command to perform the write operation in the memory 350 and/or may include data, e.g., data to be written. In one implementation, the memory controller 310 may output the signal s15 to the host 110 immediately after outputting the signal s13 (S150), in one implementation, the memory controller 310 may output the signal s15 to the host 110, after temporarily storing data to be stored in the memory 350 in an internal buffer of the memory controller 310. Below, for convenience of description, it is assumed that the memory controller 310 outputs the signal s15 based on the signals s12 and s14 after the memory 350 completes an operation.

Figure 3:
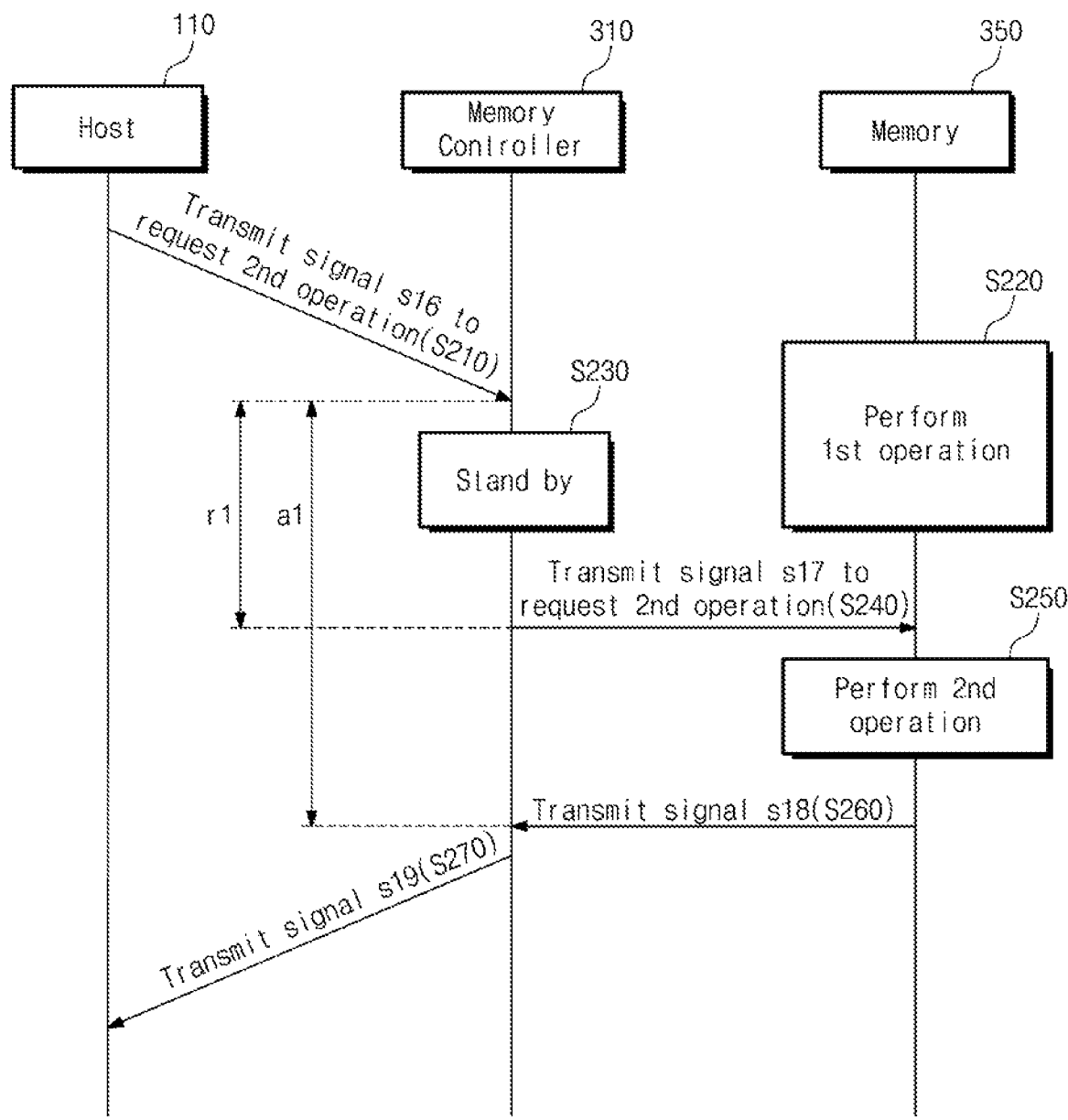
FIG. 3 illustrates another example operation of the electronic system.

FIG. 3 illustrates an example of how signals s16, s17, s18, and s19 may be exchanged between and among the host 110, the memory controller 310, and the memory 350 of FIG. 1. In this case, the signal s16 is input to the memory controller 310 at a time when the memory 350 is performing a first operation. The first operation may be, for example, a reclaim operation, a refresh operation, an erase operation, or another operation.

In operation S210, the host 110 may output the signal s16 to the memory controller 310. The signal s16 may include a command to perform a second operation in memory 350, and/or may include data. The second operation may be, for example, a read operation, a write operation, etc., associated with the memory 350. The memory controller 310 may receive the signal s16.

In operation S220, the memory 350 may perform the first operation. The memory 350 may be performing the first operation at a time when the signal s16 is input to the memory controller 310.

In operation S230, when the signal s16 is input to the memory controller 310 while the memory 350 is performing the first operation, the memory controller 310 may stand by until the memory 350 completes the first operation.

In operation S240, when the memory 350 completes the first operation, the memory controller 310 may output the signal s17 to the memory 350 based on the signal s16. The signal s17 may include a command to perform the second operation in the memory 350, and/or may include data. The memory 350 may receive the signal s17. A delay interval r1 may exist between the time when the memory controller 310 receives the signal s16 and the time when the memory controller 310 outputs the signal s17.

In operation S250, the memory 350 may perform the second operation based on the signal s17.

In operation S260, when the memory 350 completes the second operation, the memory 350 may output the signal s18 to the memory controller 310. The signal s18 may include information indicating that the memory 350 has completed the second operation, and/or may include data. The memory controller 310 may receive the signal s18. An operation interval a1 may exist between the time when the memory controller 310 receives the signal s16 and the time when the memory controller 310 receives the signal s18.

In operation S270, the memory controller 310 may output the signal s19 to the host 110 based on the signal s18.

Thus, in the process flow of FIG. 3, the signal s16 may input to the memory controller 310 while the memory 350 is performing the first operation. The memory 350 may then perform the second operation requested from the host 110 after the memory 350 completes the first operation. Accordingly, the delay interval r1 and the operation interval a1 may be greater than the reference delay interval r0 and the reference operation interval a0, respectively. An operation interval difference (a1−a0) may be identical or proportional to a delay interval difference (r1−r0).

In one embodiment, a reference delay interval may correspond to a time interval between the time when the memory controller 310 receives the signal s12 and the time when the memory controller 310 outputs the signal s13, in the case where the signal s12 is input to the memory controller 310 while the memory 350 does not operate, e.g., is not performing an operation.

A reference operation interval may correspond to a time interval between the time when the memory controller 310 receives the signal s12 and the time when the memory controller 310 receives the signal s14, in the case where the signal s12 is input to the memory controller 310 while the memory 350 does not operate, e.g., is not performing an operation.

The signal s19 may be output from the memory controller 310 later than the signal s15 by an amount of time which corresponds to at least the operation interval difference (a1−a0). Accordingly, the signal s19 may be input to the host 110 later than the signal s15 by an amount of time that corresponds to at least the operation interval difference (a1−a0). These time differences (or delays) may deteriorate the quality of service of the storage device 300.

In accordance with one or more embodiments, the time delay in transmitting the signal s19 to the host 110 may be reduced or minimized. In at least one embodiment, a delayed signal in the following description may correspond to a signal which is output from the memory controller 310 to the host 110, in response to a signal input from the host 110 to the memory controller 310, while the memory 350 is performing an operation.

Figure 4:
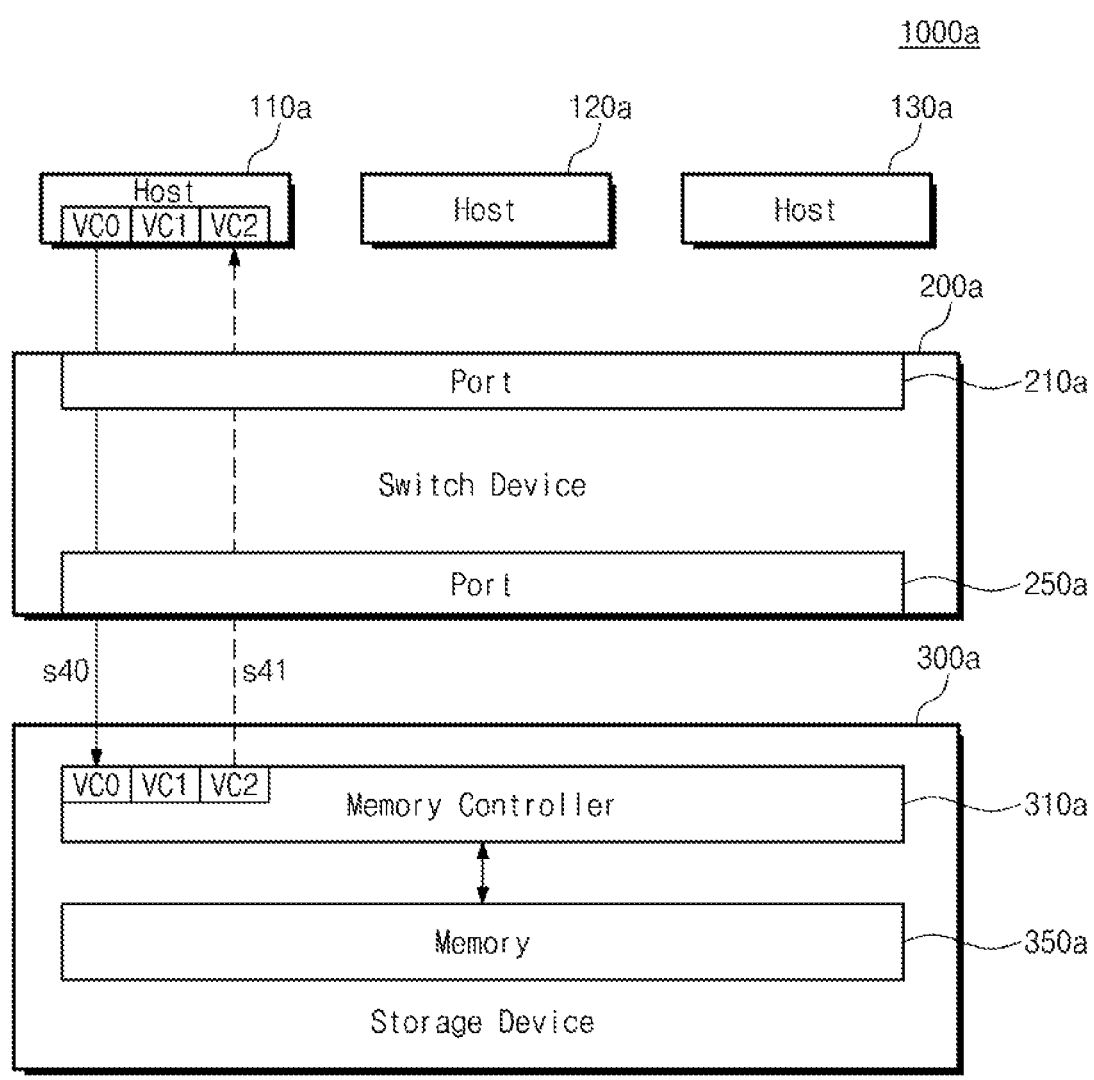
FIG. 4 illustrates an embodiment of an electronic system.

FIG. 4 illustrates an embodiment of an electronic system 1000a which includes components 110a, 120a, 130a, 200a, 210a, 250a, 300a, 310a, and 350a that may correspond to the components 110, 120, 130, 200, 210, 250, 300, 310, and 350 of the electronic system 1000 illustrated in FIG. 1.

In this embodiment, memory controller 310a receives a signal s40 while memory 350a is performing an operation. However, unlike memory controller 310, the memory controller 310a may output a signal s41 in consideration of one or more of a delay interval, an operation interval, or an operating state of the memory 350a.

In operation, the host 110a may output the signal s40 to the memory controller 310a through the channel VC0. The memory controller 310a may receive the signal s40 through the channel VC0 and output the signal s41 to the host 110a in response to the signal s40.

The memory controller 310a may transmit the signal s41 through a channel VC2 different from the channel VC0 in consideration of one or more of a delay interval, an operation interval, or an operating state of the memory 350a. For example, the memory controller 310a may monitor an operating state of the memory 350a. When the signal s40 is input to the memory controller 310a While the memory 350a is performing an operation, the memory controller 310a may transmit the signal s41 through the channel VC2. An example embodiment of a method in which the memory controller 310a monitors an operating state of the memory 350a will be more fully described with reference to FIGS. 5 and 6.

As described, for example, with reference to FIGS. 2 and 3, when the signal s40 is input to the memory controller 310a while the memory 350a is performing an operation, a delay interval and an operation interval may be greater than a reference delay interval and a reference operation interval, respectively.

The memory controller 310a may count the delay interval and compare the delay interval with the reference delay interval. In the case where the counted delay interval is greater than the reference delay interval, the memory controller 310a may transmit the signal s41 through the Channel VC2.

The memory controller 310a may count the operation interval and compare the operation interval with the reference operation interval. In the ease where the counted operation interval is greater than the reference operation interval, the memory controller 310a may transmit the signal s41 through the channel VC2.

In one embodiment, the memory controller 310a may select one of the channels VC1 and VC2 and may output the signal s41 through the selected channel. An example embodiment of a method in which the memory controller 310a selects a channel will be more fully described with reference to FIGS. 5 and 6.

The speed at which data are transmitted through the channel VC1 or the channel VC2 may be higher than a speed at which data are transmitted through the channel VC0. Also, a speed at which data are transmitted through the channel VC1 may be higher than or identical to a speed at which data are transmitted through the channel VC2. As a result, the quality of service of the storage device 300a may be improved. In the following descriptions, it is assumed that a speed at which data are transmitted through the channel VC1 is higher than a speed at which data are transmitted through the channel VC2.

In general, the host 110a may transmit data through the channel VC0. Accordingly, the amount of data transmitted through the channel VC0 may be larger than the amount of data transmitted through the channel VC1 or the channel VC2. In the case where the amount of data which are transmitted through the channel VC0 increases, collision may occur between portions of data transmitted through the channel VC0, or a speed at which data are transmitted through the channel VC0 may become slow.

In order to increase the speed of transmitting data to the host 110a, the storage device 300a may output data through the channel VC1 or the channel VC2. For example, in one case, the hosts 110 and 110a may select the channel VC0 for purposes of transmitting signal s10 or s40. The hosts 110 and 110a may then transmit the signal s10 or s40 through the selected channel VC0. The storage device 300 may output signal s11 through the channel VC0 selected from the host 110.

However, in the case where the signal s40 is input to the memory controller 310a while the memory 350a is performing an operation, the storage device 300a may select one of the channels VC1 and VC2. The storage device 300a may output the signal s41 through the selected channel. That is, the storage device 300a may compensate for an increased delay time and an increased operating time by outputting the signal s41 through the channel VC1 or the channel VC2. An example will be more fully described with reference to FIG. 5.

The host 110a may receive the signal s41 through the channel VC2 and may store data associated with the channels VC1 and VC2. The stored data may indicate that a signal received through the channel VC1 or the channel VC2 is a delayed signal. The host 110a may determine the signal s41 as the delayed signal based on the stored data.

Figure 5:
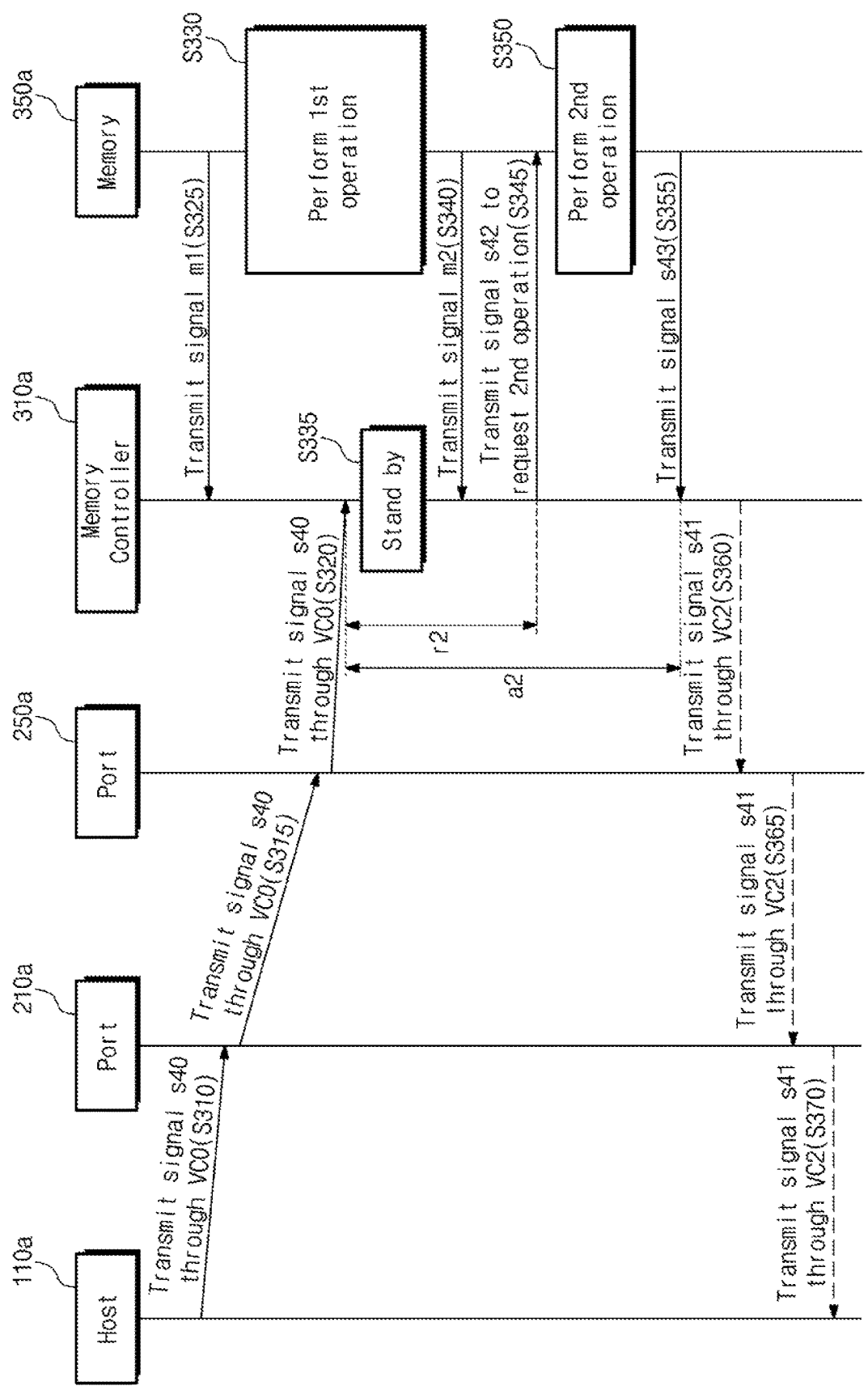
FIG. 5 illustrates operation of the electronic system of FIG. 4 according to an embodiment.

FIG. 5 illustrates an embodiment of a method of operation of the electronic system of FIG. 4. In this method, the memory controller 310a monitors an operating state of the memory 350a and selects one of the channels VC1 and VC2 based on one or more of an operating state of the memory 350a, a delay interval, or an operation interval.

In operation S310, the host 110a may output the signal s40 to the memory controller 310a. The host 110a may output the signal s40 to a port 210a through the channel VC0. The signal s40 may include a command for the memory 350a to perform a second. operation, and/or may include data. The port 210a may receive the signal s40.

In operation S315, the port 210a may output the received signal s40 to a port 250a through the channel VC0. The port 250a may receive the signal s40.

In operation S320, the port 250a may output the received signal s40 to the memory controller 310a through the channel VC0. The memory controller 310a may receive the signal s40.

In operation S325, the memory 350a may output a signal m1 to the memory controller 310a. The signal m1 may include information indicating that the memory 350 will start a first operation. The memory controller 310a may receive the signal m1 and monitor an operating state of the memory 350a after the signal m1 is received.

In operation S330, the memory 350a may perform the first operation.

In operation S335, when the signal s40 is input to the memory controller 310a while the memory 350a is performing the first operation, the memory controller 310 may stand by based on the signal m1 until the memory 350a completes the first operation.

When the signal s40 is input to the memory controller 310a while the memory 350a is performing the first operation, the memory controller 310 may output the signal s41, through one of the channels VC1 and VC2, based on the signal m1. In the case where the signal s40 is input to the memory controller 310a while the memory 350a does not operate (e.g., is not performing one or more predetermined operations or not performing any operation), the memory controller 310a may transmit the signal s41 through the channel VC0.

The memory controller 310a may select one of the channels VC1 and VC2 based on the signal m1.The signal m1 may include information about a kind of the first operation which the memory 350 has started to perform. The memory controller 310a may select the channel VC1 or the channel VC2 based on the kind of the first operation. For example, when the first operation is an erase operation, the memory controller 310a may select the channel VC1. When the first operation is a read operation, the memory controller 310a may select the channel VC2. The time to perform the erase operation may be longer than the time to perform the read operation. In the case where the first operation is an erase operation, the memory controller 310a may select the channel VC1 instead of the channel VC2 for the purpose of transmitting data more quickly.

In operation S340, the memory 350a may complete the first operation. The memory 350a may output a signal m2 to the memory controller 310a, The memory controller 310a may receive the signal m2. The signal m2 may include information indicating that the memory 350a has completed the first operation. The memory controller 310a may monitor an operating state of the memory 350a completing the first operation, based on the signal m2.

In operation S345, the memory controller 310a may output a signal s42 to the memory 350a based on the signal s40. The signal s42 may include a command directing the memory 350a to perform a second operation, and/or may include data. The memory 350a may receive the signal s42.

The memory controller 310a may count a delay interval r2 based on the signals s40 and s42. The memory controller 310a may include information of a reference delay interval. The reference delay interval may be the reference delay interval r0 described, for example, with reference to FIG. 2. The memory controller 310a may compare the reference delay interval with the delay interval r2. In the case where the delay interval r2 is greater than the reference delay interval, the memory controller 310a may transmit the signal s41 through one of the channels VC1 and VC2. In the case where the delay interval r2 is not greater than (e.g., equal to or smaller than) the reference delay interval, the memory controller 310a may transmit the signal s41 through the channel VC0.

The memory controller 310a may include information about a first reference delay interval and a second reference delay interval. The first reference delay interval may be greater than the second reference delay interval. The second reference delay interval may be the reference delay interval r0 described, for example, with reference, to FIG. 2. The memory controller 310a may select one of the channels VC1 and VC2 based on the delay interval r2, the first reference delay interval, and the second reference delay interval. In the case where the delay interval r2 is greater than the first reference delay interval, the memory controller 310a may select the channel VC1. In the case where the delay interval r2 is smaller than the first reference delay interval and is greater than the second reference delay interval, the memory controller 310a may select the channel VC2. In the case where the delay interval r2 is greater than the first reference delay interval, the memory controller 310a may select the channel VC1 instead of the channel VC2 for the purpose of transmitting data more quickly.

In operation S350, the memory 350a may perform the second operation based on the signal s42.

In operation S355, when the memory 350a has completed the second operation, the memory 350a may output a signal s43 to the memory controller 310a. The memory controller 310a may receive the signal s43, which may include information indicating that the memory 350a has completed the second operation and/or relevant data.

The memory controller 310a may count an operation interval a2 based on the signals s40 and s43. The memory controller 310a may include information about a reference operation interval. The reference operation interval may be the operation interval a0, for example, described with reference to FIG. 2. The memory controller 310a may compare the reference operation interval with the operation interval a2. In the case where the operation interval a2 is greater than the reference operation interval, the memory controller 310a may transmit the signal s41 through One of the channels VC1 and VC2. In the case where the operation interval a2 is not greater than (e.g., equal to or smaller than) the reference operation interval, the memory controller 310a may transmit the signal s41 through the channel VC0.

The memory controller 310a may include information about a first reference operation interval and a second reference operation interval. The first reference operation interval may be greater than the second reference operation interval. The second reference operation interval may be the reference operation interval a0, for example, described with reference to FIG. 2.

The memory controller 310a may select one of the channels VC1 and VC2 based on one or more of the operation interval a2, the first reference operation interval, and the second reference operation interval. In the case where the operation interval a2 is greater than the first reference operation interval, the memory controller 310a may select the channel VC1. In the case where the operation interval a2 is smaller than the first reference operation interval and is greater than the second reference operation interval, the memory controller 310a may select the channel VC2, in the case where the operation interval a2 is greater than the first reference operation interval, the memory controller 310a may select the channel VC1 instead of the channel VC2 for the purpose of transmitting data more quickly.

In operation S360, the memory controller 310a may output the signal s41 to the port 250a based on the signal s43. Below, it is assumed that the memory controller 310a selects the channel VC2 based on operation S325 to operation S355. The memory controller 310a may output the signal s41 to the port 250a through the channel VC2. The port 250a may receive the signal s41.

In operation S365, the port 250a may output the received signal s41 to the port 210a through the channel VC2. The port 210a may receive the signal s41.

In operation S370, the port 210a may output the received signal s41 to the host 110 a through the channel VC2. The host 110a may receive the signal s41 through the channel VC2.

Thus, in accordance with one or more embodiments, the storage device 300a may compensate for an increased delay time and an increased operating time by outputting the signal s41 through the channel VC1 or the channel VC2. For example, as described with reference to FIG. 3, the signal s19 may be output from the memory controller 310a after the signal s15 by an amount of time corresponding to as much as the operation interval difference (a1−a0). Accordingly, the signal s19 may be input to the host 110a after the signal s15 by an amount of time corresponding to as much as the operation interval difference (a1−a0).

As described with reference to FIG. 5, the signal s41 may be output from the memory controller 310a after the signal s15 by an amount of time corresponding to as much as the operation interval difference (a2−a0). In contrast, unlike the signal s19, a time interval between the time when the signal s41 is input to the host 110a and the time when the signal s15 is input to the host 110 may be smaller than the operation interval difference (a2−a0).

Figure 6:
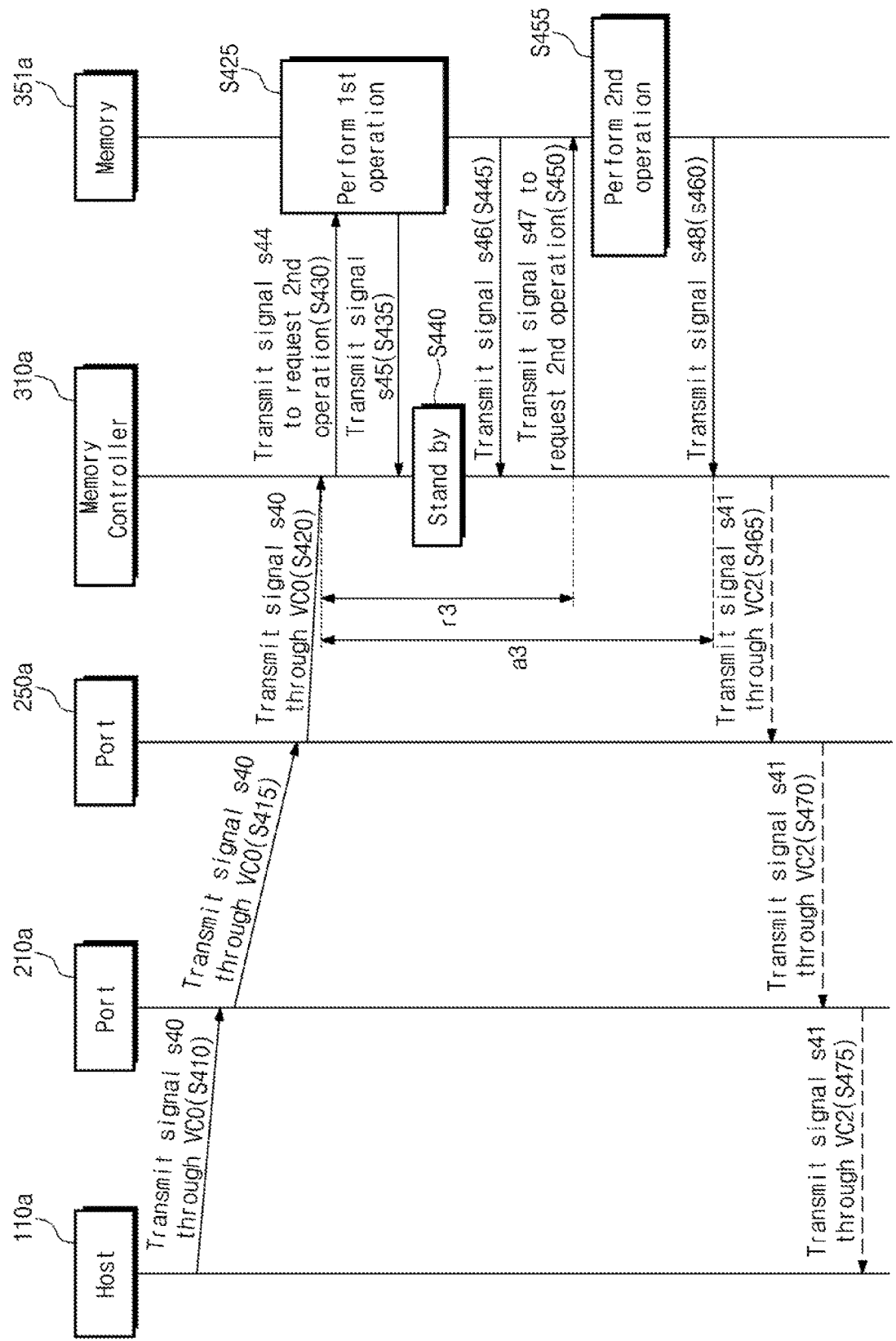
FIG. 6 illustrates operation of the electronic system of FIG. 4 according to an embodiment.

FIG. 6 illustrates another embodiment of a method of operation of the electronic system 1000a of FIG. 4. For better understanding, FIGS. 4 and 5 will be referenced together. In this embodiment, operation S410 to operation S420 and operation SS40 to operation S475 in FIG. 6 may correspond to operation S310 to operation S320 and operation S335 to operation S370 in FIG. 5.

A memory 351a illustrated in FIG. 6 may perform operations similar to those of the memory 350a described with reference to FIGS. 4 and 5. However, unlike the memory 350a, the memory 351a may output a signal s45 including information indicative of an operating state of the memory 351a, after a signal s44 is received from the memory controller 310a.

In operation S425, the memory 351a may perform the first operation.

In operation S420, the memory controller 310a may receive the signal s40 through the channel VC0 while the memory 351a is performing the first operation.

In operation S430, the memory controller 310a may output the signal s44 to the memory 351a based on the signal s40. The signal s44 may include a command directing the memory 351a to perform the second operation, and/or may include data. The memory 351a may receive the signal s45 while performing the first operation.

In operation S435, while the memory 351a is performing the first operation, the memory 351a may output the signal s45 to the memory controller 310a. The signal s45 may include information indicating that the memory 351a is performing the first operation. The memory controller 310a may receive the signal s45. The memory controller 310a may monitor an operating state of the memory 351a, performing the first operation, based on the signal s45.

In operation S440, the memory controller 310a may stand by based on the signal s45 until the memory 351a has completed the first operation.

In operation S460, the memory controller 310a may output the signal s41 through one of the channels VC1 and VC2. For example, the memory controller 310a may monitor an operating state of the memory 351a based on the signal s45 and may select one of the channels VC1 and VC2 based on an operating state of the memory 351a at a time point when the signal s40 is received.

In one embodiment, the memory controller 310a may count a delay interval r3 based on the signal s40 and a signal s47 and then compare the delay interval r3 and a reference delay interval and select one of the channels VC1 and VC2. In one embodiment, the memory controller 310a may count an operation interval a3 based on the signal s40 and a signal s48 and then compare the operation interval a3 and a reference operation interval and select one of the channels VC1 and VC2.

Figure 7:
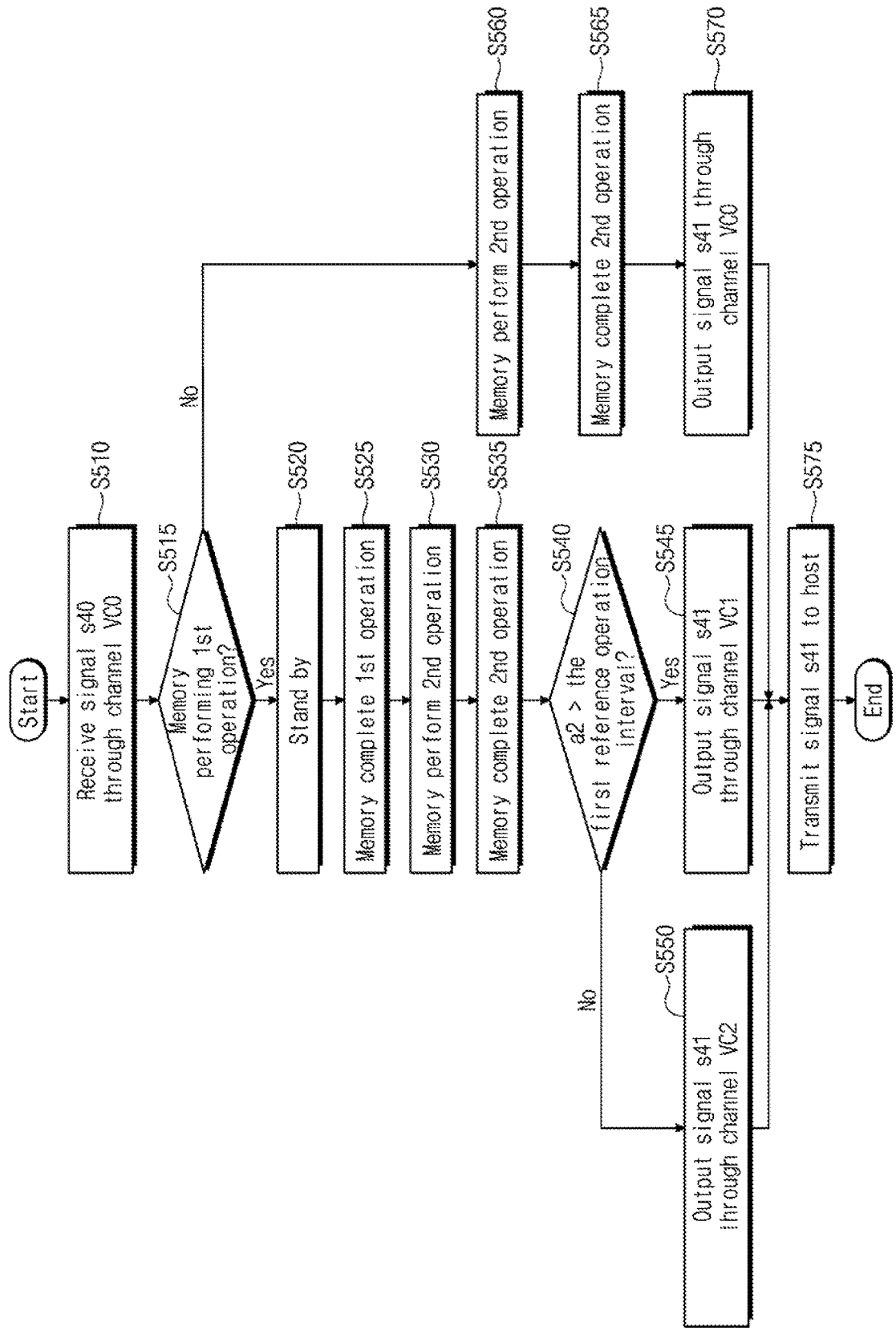
FIG. 7 illustrates operation of the electronic system of FIG. 4 according to an embodiment.

FIG. 7 illustrates another embodiment of a method of operation of the electronic system 1000a of FIG. 4. For better understanding, FIG. 5 will be referenced together.

In operation S510, the host 110a may output the signal s40 to the memory controller 310a through the channel VC0. The memory controller 310a may receive the signal s40 through the channel VC0. The signal s40 may include a command directing the memory 350a to perform the second operation, and/or data. Operation S510 may correspond to operation S310 to operation S320, for example, as illustrated in FIG. 5.

In operation S515, the memory controller 310a may monitor an operating state of the memory 350a. Operation S515 may correspond, for example, to operation S325 illustrated in FIG. 5 or operation S435 illustrated in FIG. 6.

Examples of methods performed by the memory controller 310a for monitoring an operating state of the memory 350a are described with reference to FIGS. 5 and 6.

In operation S520, when the signal s40 is input to the memory controller 310a while the memory 350a is performing the first operation, the memory controller 310 may stand by until the memory 350a completes the first operation. Operation S520 may correspond, for example, to operation S335 illustrated in FIG. 5 or operation S440 illustrated in FIG. 6.

In operation S525, the memory 350a may complete the first operation. As described with reference to FIG. 5, when the memory 350a completes the first operation, the memory 350a may output the signal m2 to the memory controller 310a. The signal m2 may include information indicating that the memory 350a has completed the first operation. The memory controller 310a may monitor an operating state of the memory 350a (indicating that the first operation has been completed) based on the signal m2. Operation S525 may correspond, for example, to operation S340 illustrated in FIG. 5 or operation S445 illustrated in FIG. 6.

In operation S530, in the case where the memory 350a has completed the first operation, the memory controller 310a may direct the memory 351a to perform the second operation. The memory 351a may perform the second operation under control of the memory controller 310a. Operation S525 may correspond, fix example, to operation S345 to operation S350 illustrated in FIG. 5.

In operation S535, the memory 350a may complete the second operation. As described with reference to FIG. 5, when the memory 350a completes the second operation, the memory 350a may output the signal s43 to the memory controller 310a. The signal s43 may include information indicating that the memory 350a has completed the second operation. The memory controller 310a may count the operation interval a2 based on the signals s40 and s43. Operation S535 may correspond, for example, to operation S355 illustrated in FIG. 5 or operation S460 illustrated in FIG. 6.

In operation S540, the memory controller 310a may compare a first reference operation interval with the operation interval a2.

In operation S545, in the case where the operation interval a2 is greater than the first reference operation interval, the memory controller 310a may select the channel VC1 from the channels VC1 and VC2. The memory controller 310a may output the signal s41 through the channel VC1.

In operation S555, in the case where the operation interval a2 is smaller than the first reference operation interval, the memory controller 310a may select the channel VC2 from the channels VC1 and VC2. The memory controller 310a may output the signal s41 through the channel VC2. Operation S540 to operation S550 may correspond, for example, to operation S360 illustrated in FIG. 5.

The memory controller 310a may select one of the channels VC1 and VC2, for example, based on the operation interval a2 as described with reference to operation S540 to operation S550. As described with reference to FIGS. 5 and 6, the memory controller 310a may be configured to select one of the channels VC1 and VC2 based on one or more of the operating state of the memory 350a, the delay interval r2, or the operation interval a2.

In operation S560, when the signal s40 is input to the memory controller 310a while the memory 350a does not operate (e.g., is not performing an operation), the memory controller 310a may direct the memory 350a to perform the second operation. The memory 350a may perform the second operation under control of the memory controller 310a. Operation S560 may be substantially identical to operation S530.

In operation S565, the memory 350a may complete the second operation. Operation S565 may be substantially identical to operation S535. In the case where the memory 350a completes the second operation, the memory 350a may output, to the memory controller 310a, a signal including information indicating that the second operation has been completed.

In operation S570, the memory controller 310a may output the signal s41 through the channel VC0 based on a signal received from the memory 350a.

In operation S575, the signal s41 may be transmitted to the host 110a from the memory controller 310a.

Figure 8:
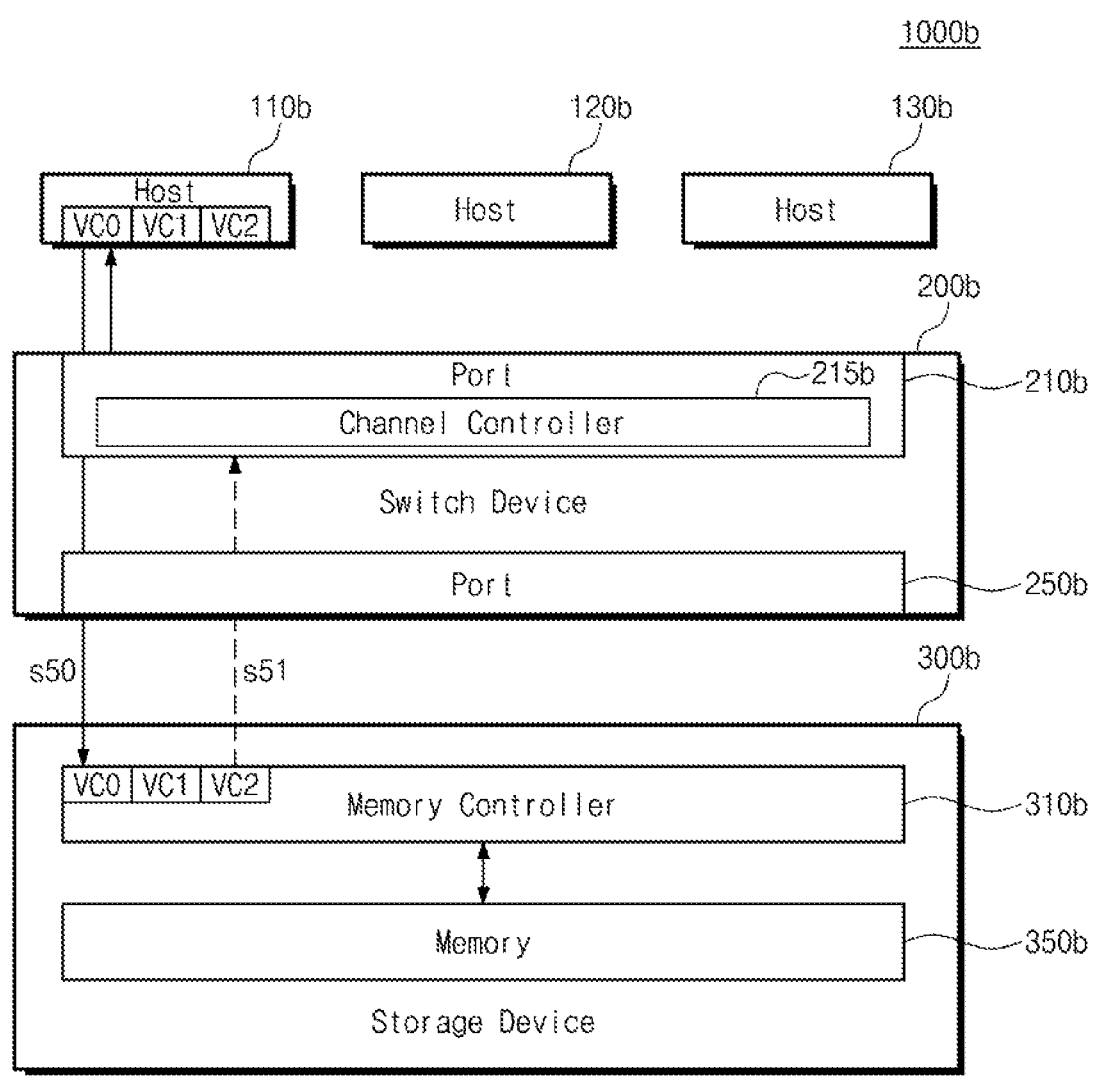
FIG. 8 illustrates another embodiment of an electronic system.

FIG. 8 illustrates another embodiment of an electronic system 1000b including a memory controller 310b which receives a signal s50 from a host 110b while a memory 350b performs an operation. In the embodiment of FIG. 8, components 110b, 120b, 130b, 200b, 210b, 250b, 300b, 310b, and 350b may perform operations corresponding to the components 110a, 120a, 130a, 200a, 210a, 250a, 300a, 310a, and 350a of the electronic system 1000 illustrated in FIG. 4. However, unlike port 210a, a port 210b may include a channel controller 215b.

The host 110b may output the signal s50 to the memory controller 310b through the channel VC0. The memory controller 310b may receive the signal s50 through the channel VC0 and output a signal s51 in response to the signal s50. The memory controller 310b may output the signal s51 to a port 250b through the channel VC2.

When the memory controller 310b outputs signal s51 through the channel VC2, the signal s51 may include data associated with the channel VC0. An example of the data associated with the channel VC0 will be described with reference to FIG. 9.

The port 250b may receive the signal s51 through the channel VC2 and output the signal s51 through the channel VC2. The port 250b may include the channel controller 215b. The channel controller 215b may analyze the signal s51 received through the channel VC2. The signal s51 may include data associated with the channel VC0. The channel controller 215b may change a channel, through which the signal s51 is transmitted, e.g., from the channel VC2 to the Channel VC0, based on the data associated with the channel VC0. The channel controller 215b may output the signal s51 through the channel VC0.

The host 110b may receive the signal s51 from the channel controller 215b through the channel VC0. Accordingly, unlike the host 110a, the host 110b might not store data associated with the channels VC1 and VC2.

Figure 9:
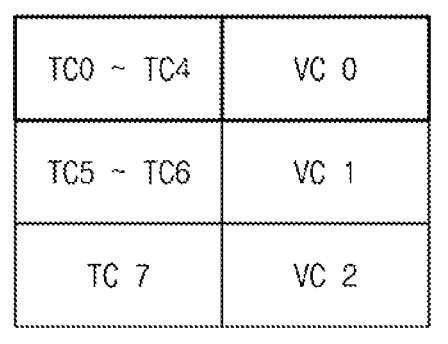

FIG. 9 illustrates an example describing data associated with a channel. In the case of outputting the signal s51 through the channel VC2, the memory controller 310b may include data associated with the channel VC0 in the signal s51. In one embodiment, data associated with the channels VC0 to VC2 may be stored in one or more predetermined fields (e.g., a traffic class (TC) field, a reserved field, etc.) included in a signal. Below, examples of data associated with the channels VC0 to VC2 are expressed as channel data.

Referring to FIG. 9, channel data may be mapped onto each of the channels VC0 to VC2. For example, channel data TC0 to TC4 may be mapped onto the channel VC0, channel data TC5 and TC6 may be mapped onto the channel VC1, and channel data TC7 may be mapped onto the channel VC2. The host 110b, the memory controller 310b, the ports 250a and 250b, and the channel controller 215b may store mapping information indicative of a mapping relationship between channel data and the channels VC0 to VC2.

In the case of outputting the signal s50 through the channel VC0, the host 110b may include channel data (one of TC0 to TC4) corresponding to the channel VC0 in the signal s50. For illustrative purposes, it is assumed below that the signal s50 includes the channel data TC4, which, for example, may indicate that the signal s51 is transmitted through the channel VC0.

In one embodiment, the memory controller 310b illustrated in FIG. 4 may include the channel data TC7 in the signal s41 in the case of outputting the signal s41 through the Channel VC2. The channel data TC7 may indicate that the signal s41 is transmitted through the channel VC2.

In contrast, in the case of outputting the signal s51 through the channel VC2, the memory controller 310b may include the channel data TC4 and TC7 in the signal s51. The channel data TC7 may indicate that the signal s51 is transmitted through the channel VC2. The channel data TC4 may indicate that the signal s50 corresponding to the signal s51 is output from the host 110b through the channel VC0.

The channel controller 215b may receive the signal s51 through the channel VC2 and analyze the channel data TC4 included in the signal s51. The channel controller 215b may output the signal s51 through the channel VC0 based on the channel data TC4 and mapping information. However, data associated with a channel may correspond, for example, to those described with reference to FIG. 9. In another embodiment, the data may be different from that illustrated in HG. 9 or may be included in the TC field or the reserved field.

Figure 10:
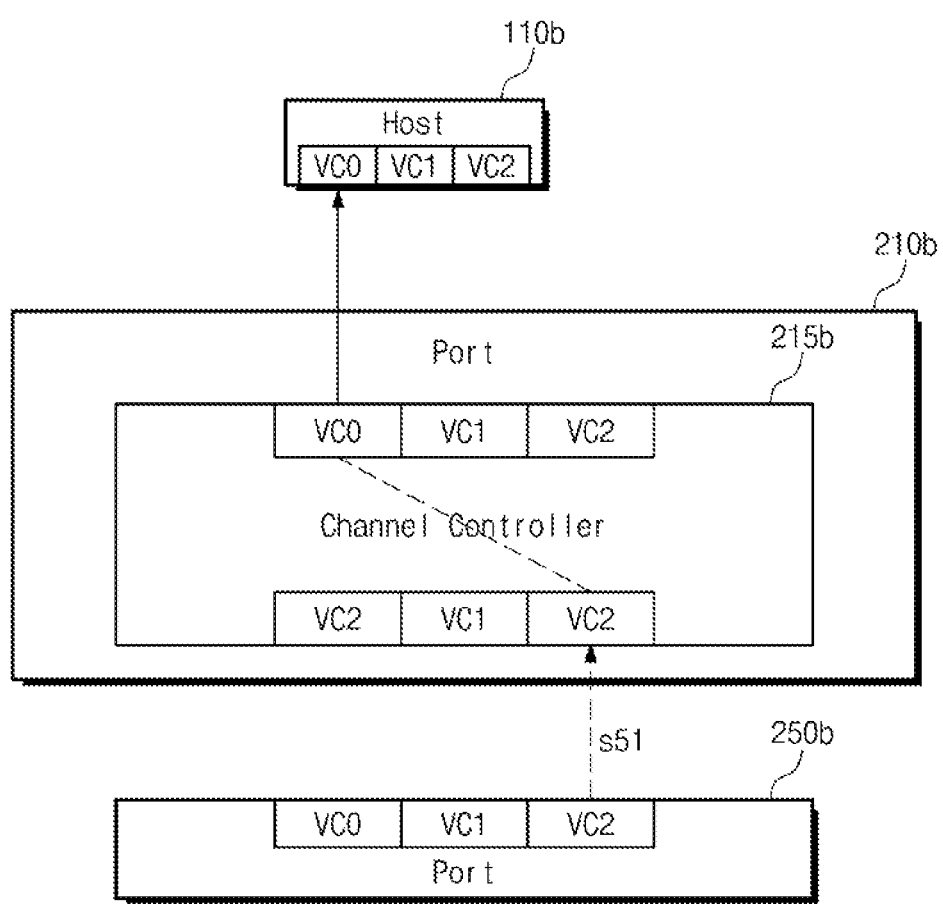
FIG. 10 illustrates an embodiment of a channel controller.

FIG. 10 illustrates an embodiment of the channel controller 215b illustrated in FIG. 8. As described with reference to FIGS. 8 and 9, the channel controller 215b may analyze the signal s51 received through the channel VC2. The channel controller 215b may change a channel, through which the signal s51 is transmitted (for example, from the channel VC2 to the channel VC0), based on the channel data TC4 and mapping information. The channel controller 215b may output the signal s51 through the channel VC0.

Figure 11:
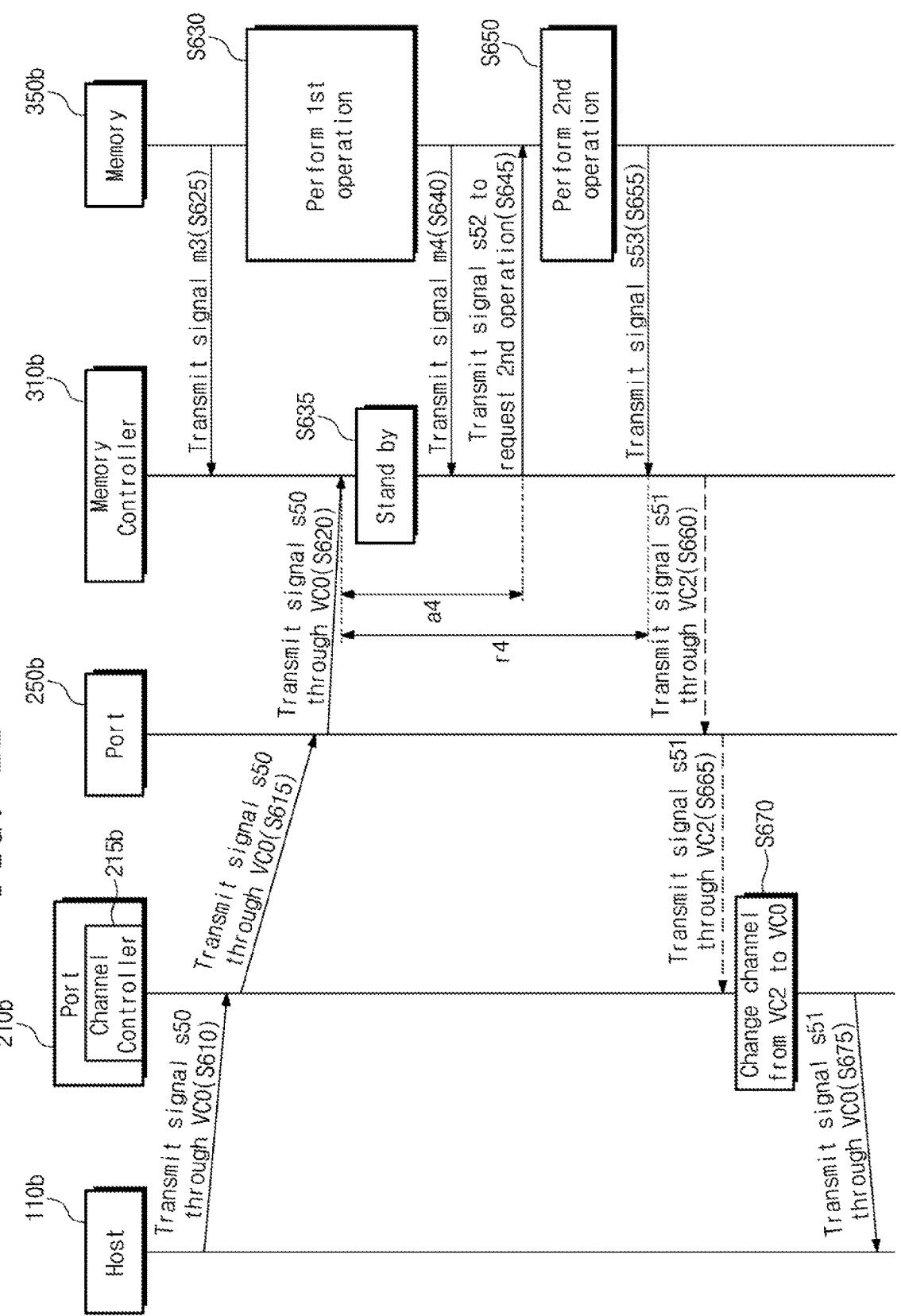
FIG. 11 illustrates operation of the electronic system of FIG. 8 according to an embodiment.

FIG. 11 another embodiment of an operation of the electronic system 1000b of FIG. 8. Operation S610 to operation S665 illustrated in FIG. 11 may correspond, for example, to operation S310 to operation S365 illustrated in FIG. 5. A delay interval r4 and an operation. interval a4 illustrated in FIG. 11 may correspond, for example, to the delay interval r2 and the operation interval a2 illustrated in FIG. 5. Below, a description associated with the flowchart illustrated in FIG. 11 will mainly focus on operation S670 and operation S675.

In operation S665, the channel controller 215b may receive the signal s51 through the channel VC2.

In operation S670, the channel controller 215b may analyze the signal s51 and may change a channel, through which the signal s51 is transmitted (e.g., from the channel VC2 to the channel VC0), based on the channel data TC4 and mapping information. The channel controller 215b may output the signal s51 through the channel VC0.

In operation S675, the host 110b may receive the signal s51 through the channel VC0.

Figure 12:
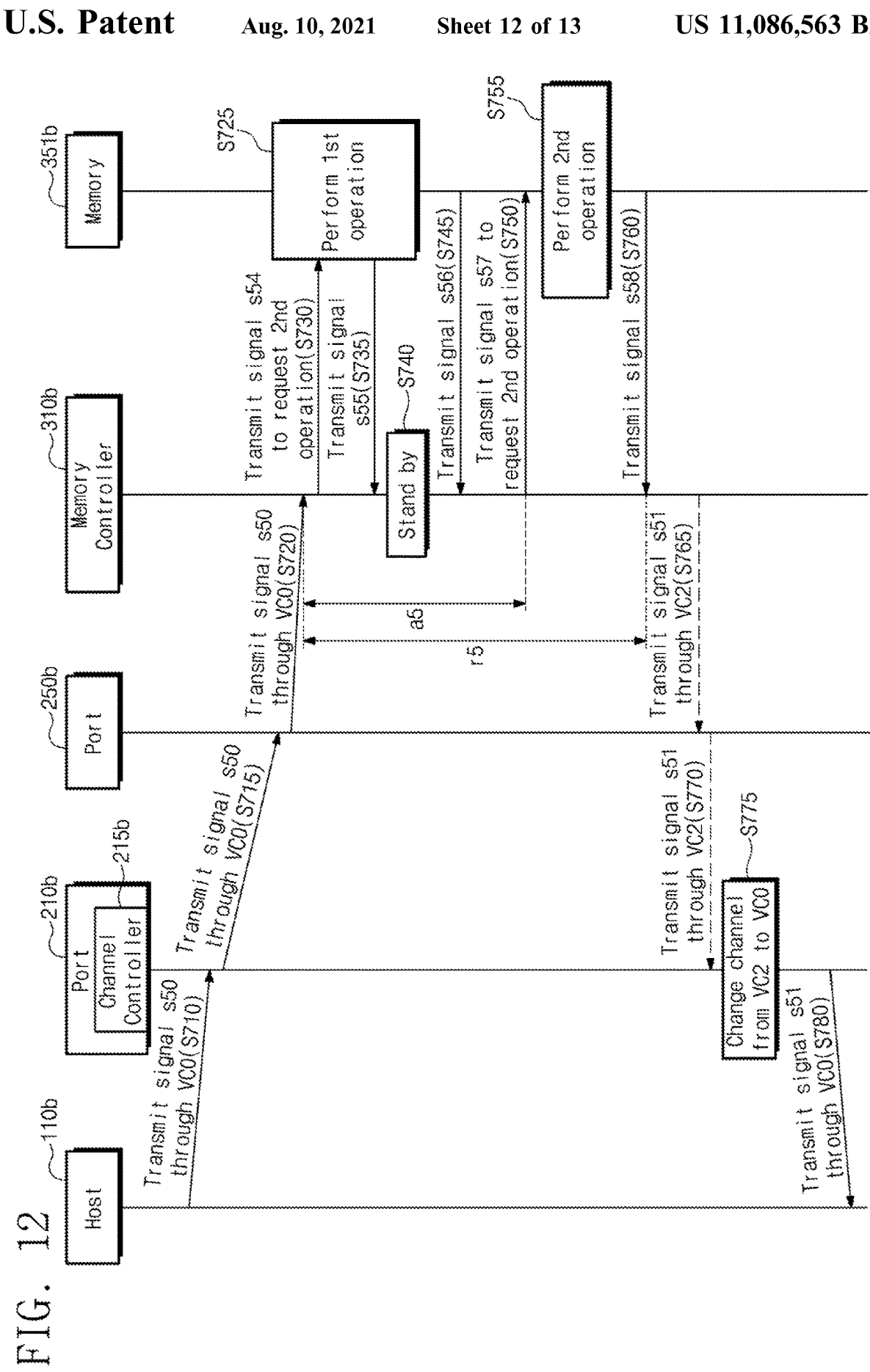
FIG. 12 illustrates operation of the electronic system of FIG. 8 according to an embodiment.

FIG. 12 illustrates another embodiment of an operation of electronic system 1000b of FIG. 8. Operation S710 to operation S770 illustrated in FIG. 12 may correspond, for example, to operation S410 to operation S470 illustrated in FIG. 6. A delay interval r5 and an operation interval a5 illustrated in FIG. 11 may correspond, for example, to the delay interval r3 and the operation interval a3 illustrated in FIG. 6. The memory 351b illustrated in FIG. 12 may perform operations similar to those of the memory 351a described with reference to FIG. 6. Below, a description associated with the flowchart illustrated in FIG. 12 will mainly focus on operation S775.

In operation S770, the channel controller 215b may receive the signal s51 through the channel VC2.

In operation S775, the channel controller 215b may analyze the signal s51 and may change a channel, through which the signal s51 is transmitted (e.g., from the channel VC2 to the channel VC0), based on the channel data TC4 and mapping information. The channel controller 215b may output the signal s51 through the channel VC0.

In operation S780, the host 110b may receive the signal s51 through the channel VC0.

Figure 13:
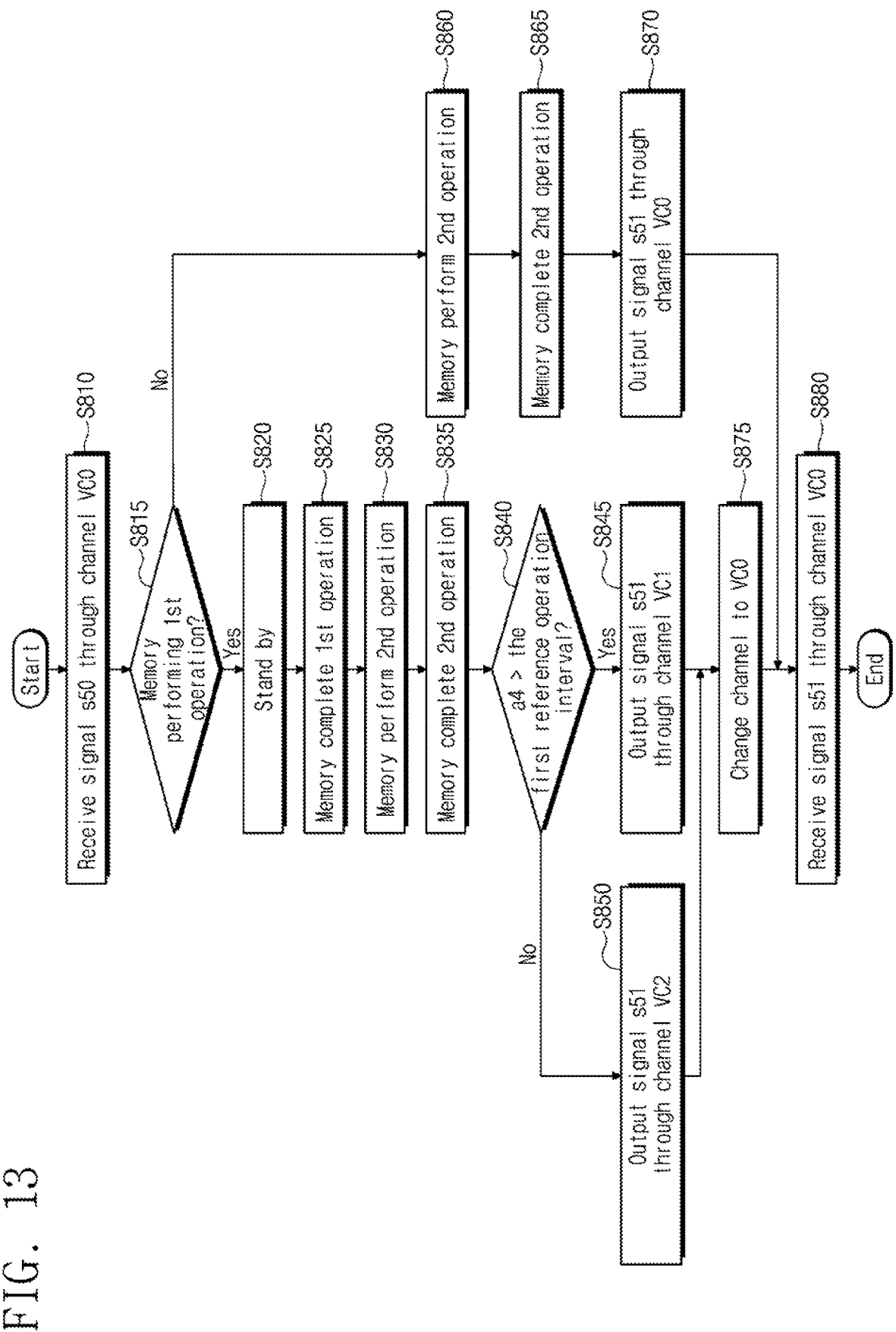
FIG. 13 illustrates operation of the electronic system of FIG. 8 according to an embodiment.

FIG. 13 illustrates another embodiment of an operation of electronic system 1000b of FIG. 8. Operation S810 to operation S870 illustrated in FIG. 13 may correspond, for example, to operation S510 to operation S570 illustrated in FIG. 7. Below, a description associated with the flowchart illustrated in FIG. 13 will mainly focus on operation S875 and operation S880.

In operation S875, the channel controller 215b may receive the signal s51 through the channel VC2 and change a channel, through which the signal s51 is transmitted, from the channel VC2 or the channel VC1 to the channel VC0. The channel controller 215b may output the signal s51 through the channel VC0.

in operation S880, the host 110b may receive the signal s51 through the channel VC0.

In accordance with one or more of the aforementioned embodiments of the inventive concept, a memory controller may transmit a response signal to a host quickly. Accordingly, the memory controller may reduce or minimize a delay of transmission of the response signal to be provided to the host.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions that perform operations as described above. The computer-readable medium may be a volatile or non-volatile memory or other storage device, which may be removably or fixedly coupled to the computer, processor, controller, or other signal processing device which is to execute the code or instructions for performing the method embodiments described herein.

The processors, controllers, and other signal generating and signal processing features of the embodiments disclosed herein may be implemented in logic which, for example, may include hardware, software, or both. When implemented at least partially in hardware, the processors, controllers, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the processors, controllers, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A storage device comprising:
a memory configured to store data; and
a memory controller configured to:
receive a first signal from an external device through a first channel, the first signal to request the data from the memory;
obtain the data from the memory based on the first signal;
output the data to the external device through a second channel different from the first channel such that the data are transmitted to the external device, in a case where a time interval between a time when the first signal is received and a time when the data are obtained is greater than a first reference interval;
output the data through a third channel when the time interval is greater than a second reference interval, and
output the data through the second channel when the time interval is smaller than the second reference interval and greater than the first reference interval, wherein the second reference interval is greater than the first reference interval and wherein the third channel is different from the first channel and the second channel.

2. The storage device of claim 1, wherein a data transmission speed of the second channel is higher than a data transmission speed of the first channel.

3. The storage device of claim 1, wherein:
the memory controller is configured to output a second signal based on the first signal, the second signal to request the data from the memory, and
the memory is configured to output the data to the memory controller based on the second signal.

4. The storage device of claim 1, wherein the memory controller is configured to output the data to the external device through the first channel when the time interval is smaller than the first reference interval.

5. The storage device of claim 1, wherein the memory controller is configured to include channel data in the data and to output the data, and wherein the channel data is associated with the first channel.

6. The storage device of claim 1, wherein the memory controller is configured to count the time interval based on the first signal and the data.

7. A method of operating an electronic system including a memory, the method comprising:
   receiving a first signal from a host through a first channel;
   outputting a second signal to the memory based on the first signal, the second signal requesting data stored in the memory;
   obtaining the data from the memory based on the second signal;
   outputting the data through a second channel different from the first channel such that the data are transmitted to the host, in a case where a time interval between a time at which the first signal is received and a time at which the second signal is output is greater than a reference interval;
   outputting the data through a third channel when the time interval is greater than a second reference interval, and
   outputting the data through the second channel when the time interval is smaller than the second reference interval and greater than the first reference interval, wherein the second reference interval is greater than the first reference interval and wherein the third channel is different from the first channel and the second channel.

8. The method of claim 7, wherein:
   outputting the data through the second channel includes outputting the data to a switch device through the second channel, and
   the method further comprises:
      changing, by the switch device, a channel to transmit the data from the second channel to the first channel; and
      outputting the data to the host from the switch device through the first channel.

* * * * *